United States Patent Office 2,803,081
Patented Aug. 20, 1957

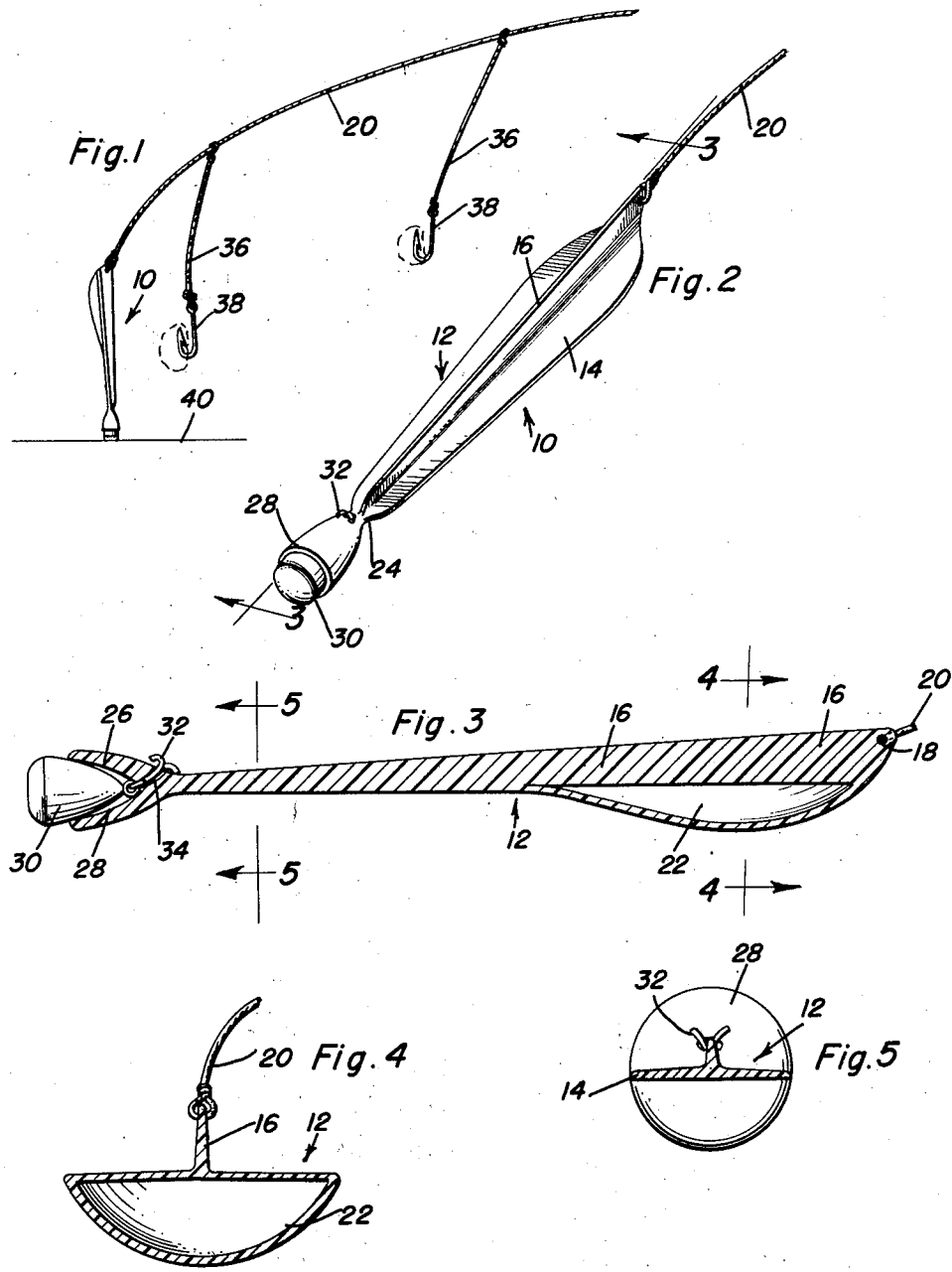
Floyd Gilbert Nicholson
INVENTOR.

2,803,081

CASTING LINE SAIL

Floyd Gilbert Nicholson, Cambridge, Nebr.

Application August 9, 1954, Serial No. 448,413

2 Claims. (Cl. 43—43.13)

This invention relates in general to new and novel improvements in fishing equipment, and more specifically to an improved casting device.

It is therefore the primary object of this invention to provide an improved casting line device in the form of a casting line sail, the casting line sail having incorporated therewith a sinker or other weight producing device, the casting line sail being of such construction whereby it has the tendency to take flight during its projection through the air so as to increase the length of cast, the casting line sail also having a tendency to bounce upon striking the water so as to extend the flight thereof.

Another object of this invention is to provide an improved carrier for sinkers, the carrier being in the form of a casting line sail to which a sinker may be attached, the casting line sail being so constructed whereby as the sinker passes through the water, the sinker moves straight down and not in an arc so as to retain the fishing line under tension.

A further object of this invention is to provide a sail for sinkers, the sail and sinker being so constructed whereby one end portion thereof has a tendency to float toward the surface as the fishing line is reeled in whereby fishing hooks attached to the fishing line move toward the surface of the water and thereby are prevented from becoming engaged with weeds and other matter normally found at the bottom.

A still further object of this invention is to provide a carrier for sinkers, the carrier being in the form of a casting line sail and having a hollow portion remote from the sinker whereby the sail has a tendency to be retained in a vertical position so as to keep the fishing line attached thereto elevated above the bottom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary elevational view of one end of a fishing line and shows attached thereto the casting line sail, a pair of fish hooks and their leaders;

Figure 2 is an enlarged perspective view of the fishing line sail and shows the general outline thereof;

Figure 3 is an enlarged longitudinal vertical sectional view taken substantially upon the plane indicated by the section line 3—3 of Figure 2;

Figure 4 is an enlarged transverse vertical sectional view taken substantially upon the plane indicated by the section line 4—4 of Figure 3; and Figure 5 is an enlarged transverse vertical sectional taken substantially upon the plane indicated by the section line 5—5 of Figure 3.

Referring now to the drawings in detail, the casting line sail is referred to in general by the reference numeral 10 and includes an elongated body 12. The body 12 has the major portion thereof formed by a wide, elongated wing 14. Formed integral with the wing 14 and projecting at right angles thereto is a directional controlling rib or wing element 16.

Formed at the forward end of the rib 16, shown in Figure 3, is an aperture 18 through which a fishing line 20 may be passed. The forward portion of the body 12 also includes an enlarged bulbous hollow compartment 22 so as to make the body buoyant at the forward end thereof.

The body 12 is reduced in size at its rear end, as at 24, and has adjacent thereto a housing 26. The housing 26 is generally conical in outline and has an opening 28 formed in the rear end thereof through the rear end of the housing 26. Removably seated within the opening 28 is a sinker 30. The sinker 30 is attached to the housing 26 by a string or wire 32 which passes through an elongated opening 34 which forms a forward continuation of the opening 28.

As seen in Figure 1 the casting line sail 10 is attached at the rear end of the fishing line 20. Connected to the fishing line 20 adjacent the casting line sail 10 are leaders 36 which have connected thereto fish hooks 38. Due to the particular construction of the casting line sail 10, the sinker 30 rests upon the bottom 40 and the casting line sail 10 is disposed in an upright position to support the fishing line 20, as well as the fish hook 38 above the bottom 40.

Because of the particular construction of the casting line sail and the provision of the wings 14, when the fishing line 20 is cast out, the sinker 30 has a tendency to pull the line 20 through the air with the wing 14 causing the casting line sail 10 to have a tendency to take flight. This will result in the initial increasing of the distance cast. Inasmuch as the casting line sail 10 will be passing through the air in a generally horizontal position, when it strikes the surface of the water, it will have a tendency to skip across the water and thereby increase the length of the cast. Further, because of the particular relationship of the sinker 30 and the chamber 22, as well as the the wing 14, the casting line sail 10 will have a tendency to sink directly downwardly and retain the fishing line 20 in taut relation.

When it is desired to reel in the fishing line 20, the effect of the reeling in operation on the casting line sail 10 is such that it will immediately come to the top of the water and float at the surface thereof. This will also result in the fishing hooks 38 rising to a position just below the surface of the water and thereby clear the bottom which may be formed with trash and have grass and the like growing thereon in which the fishing hooks 38 may be tangled.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A casting sinker comprising an elongated body having a substantially flat wing member extending on opposite sides of the longitudinal axis of the body for substantially the full length thereof and terminating at the rear portion in an enlarged rearwardly opening recessed portion containing a removable sinker, said member having an enlarged hollow buoying portion at the forward portion thereof extending across said member and extending outwardly from one side thereof, and a wing element comprising a planar member perpendicular to said wing on the side of the wing opposite from said hollow portion and extending for the full length thereof, said wing element having an aperture at the forward end thereof adapted to receive a fishig line therethrough.

2. A casting sinker comprising an elongated body having a wing member extending on opposite sides of the longitudinal axis for a major portion of the length thereof and terminating at a rear portion in an enlarged rearwardly opening recessed portion containing a removable sinker, said member having an enlarged hollow buoying portion at the forward portion thereof extending outwardly from one side thereof, a wing element comprising a member perpendicular to said wing on the side of the wing opposite from said hollow portion and extending for a major portion of the length thereof, said wing element having an aperture at the forward end thereof adapted to receive a fishing line therethrough.

References Cited in the file of this patent

UNITED STATES PATENTS

| | | |
|---|---|---|
| 402,231 | Coles et al. | Apr. 30, 1889 |
| 725,428 | Evans | Apr. 14, 1903 |
| 1,320,804 | Squarebriggs | Nov. 4, 1919 |
| 1,993,114 | Rasmussen | Mar. 5, 1935 |
| 2,140,724 | Stefan | Dec. 20, 1938 |
| 2,228,513 | Frisbie | Jan. 14, 1941 |
| 2,531,418 | Fitzharris | Nov. 28, 1950 |
| 2,566,029 | Louthan | Aug. 28, 1951 |
| 2,605,576 | Young et al. | Aug. 5, 1952 |
| 2,651,135 | Greenleaf | Sept. 8, 1953 |